US008713696B2

(12) United States Patent
Bozeman

(10) Patent No.: US 8,713,696 B2
(45) Date of Patent: Apr. 29, 2014

(54) METHOD AND SYSTEM FOR DYNAMIC DIGITAL RIGHTS BUNDLING

(75) Inventor: Neal Bozeman, Seattle, WA (US)

(73) Assignee: Demand Media, Inc., Santa Monica, CA (US)

( * ) Notice: Subject to any disclaimer, the term of this patent is extended or adjusted under 35 U.S.C. 154(b) by 2288 days.

(21) Appl. No.: 11/331,829

(22) Filed: Jan. 13, 2006

(65) Prior Publication Data

US 2007/0168288 A1    Jul. 19, 2007

(51) Int. Cl.
G06F 7/04 (2006.01)
G06F 17/30 (2006.01)
H04N 7/16 (2011.01)

(52) U.S. Cl.
USPC ............... 726/27; 705/52; 705/56; 705/59; 705/1.1; 726/21; 726/26; 726/17; 726/28; 726/29; 726/2; 726/16

(58) Field of Classification Search
USPC .......................... 705/50–79; 726/27
See application file for complete search history.

(56) References Cited

U.S. PATENT DOCUMENTS

| | | | |
|---|---|---|---|
| 6,226,618 B1 * | 5/2001 | Downs et al. ...................... 705/1 |
| 6,407,680 B1 * | 6/2002 | Lai et al. ......................... 341/50 |
| 6,453,300 B2 | 9/2002 | Simpson ........................ 705/26 |
| 6,505,242 B2 * | 1/2003 | Holland et al. ............... 709/219 |
| 6,658,464 B2 * | 12/2003 | Reisman ....................... 709/219 |
| 2002/0024539 A1 * | 2/2002 | Eleftheriadis et al. ........ 345/765 |
| 2002/0040374 A1 * | 4/2002 | Kent .............................. 707/516 |
| 2002/0124050 A1 | 9/2002 | Middeljans |
| 2002/0152215 A1 | 10/2002 | Clark et al. |
| 2003/0030750 A1 | 2/2003 | Hoarty et al. |
| 2003/0145338 A1 | 7/2003 | Harrington .................... 725/136 |
| 2004/0039594 A1 * | 2/2004 | Narasimhan et al. ............. 705/1 |
| 2004/0139200 A1 * | 7/2004 | Rossi et al. .................... 709/228 |
| 2004/0148503 A1 | 7/2004 | Sidman |
| 2004/0203851 A1 * | 10/2004 | Vetro et al. ................. 455/456.1 |
| 2005/0262024 A1 | 11/2005 | Headings et al. |
| 2006/0230070 A1 * | 10/2006 | Colton et al. .............. 707/104.1 |
| 2006/0253508 A1 * | 11/2006 | Colton et al. ................. 707/206 |
| 2006/0256130 A1 * | 11/2006 | Gonzalez ...................... 345/619 |
| 2007/0061487 A1 * | 3/2007 | Moore et al. .................. 709/246 |
| 2008/0091845 A1 * | 4/2008 | Mills et al. .................... 709/246 |

OTHER PUBLICATIONS

White, "How Computers Work", Millennium Edition, 1999, Que Corporation, Indianapolis, IN, all pages.*
Derfler, "How Networks Work," Bestseller Edition, 1996, Ziff-Davis Press, Emeryville, CA, all pages.*

(Continued)

*Primary Examiner* — Jacob C. Coppola
(74) *Attorney, Agent, or Firm* — Greenberg Traurig LLP

(57) ABSTRACT

Methods and systems for dynamically bundling portions into secured destination files are provided. Example embodiments provide a Dynamic Digital Rights Bundling System ("DDRBS"), which dynamically bundles a set of portions each variously containing digital rights management components, user interface controls, and content, into a secured destination file in response to a designated content request. In one embodiment, the DDRBS comprises a bundling engine, a translation engine, a merging engine, and an assortment of data repositories. These components cooperate to dynamically assemble and provide customized secured destination files comprising the requested content together with specialized user interface and digital rights management controls. This abstract is provided to comply with rules requiring an abstract, and it is submitted with the intention that it will not be used to interpret or limit the scope or meaning of the claims.

33 Claims, 15 Drawing Sheets

(56) References Cited

OTHER PUBLICATIONS

Gralla, "How the Internet Works," Millennium Edition, 1999, Que Corporation, Indianapolis, IN, all pages.*

Muller, "Desktop Encyclopedia of the Internet," 1999, Artech House Inc., Norwood, MA, all pages.*

"Flash Kit, A Flash Developer Resource for Macromedia Flash 8 and MX Tutorials SWF FLA Images Clipart Sounds WAVS Animation," Oct. 23, 2001, URL=http://www.flashkit.com/tutorials/Actionscripting/Basic/Easy_to_-Tiran_Da-674/index.php, download date Apr. 19, 2006, 10 pages.

Macromedia White Paper, "Macromedia Flash® Player 7 Client-Side Security," Dec. 2004, 17 pages.

Applet Security, URL=http://java.sun.com/sfaq/, download date Apr. 19, 2006, 8 pages.

Lynch, "The Flash Platform. Delivering Effective User Experiences Across Browsers, Operating Systems, and Devices," Macromedia White Paper, Jun. 2005, 32 pages.

Michelson, "Macromedia's Flash Platform. Bringing Rich Experiences to the Masses," Patricia Seybold Group, Jun. 16, 2005, 10 pages.

PCT/US07/60460—International Search Report (mailed Sep. 24, 2007).

PCT/US07/60460—Written Opinion (mailed Sep. 24, 2007).

PCT/US07/60460—International Preliminary Report on Patentability (mailed Jul. 16, 2008).

* cited by examiner

METHOD AND SYSTEM FOR DYNAMIC DIGITAL RIGHTS BUNDLING

TECHNICAL FIELD

The present description relates to methods and systems for dynamic content bundling, and, in particular, to methods and systems for dynamically bundling of digital rights management controls with user interface components and content.

BACKGROUND

With increased commercial interest in the Internet and the World Wide Web (WWW), the networked delivery of content has become commonplace. Existing content delivery systems are typically based on a client-server model, implemented with web-servers and web-clients that communicate via the Hypertext Transfer Protocol (HTTP). Many formats for the representation of content are known in the art, including Hypertext Markup Language (HTML), Extensible Markup Language (XML), Postscript™, Portable Document Format (PDF), Shockwave™ Format (SWF), Microsoft Word™, WordPerfect™, text, MPEG, JPEG, TIFF, AVI, and so on.

Existing content-delivery systems, and the content representation formats they rely on, present a number of problems. A first problem relates to the complexity of existing digital rights management (DRM) technologies. Content that is provided directly to clients in standard formats such as HTML, text, or MPEG may be copied by the client and possibly shared with other, possibly unauthorized users. Digital rights management includes a general class of techniques that can be used to prevent unauthorized access to content. In some DRM approaches, content is encrypted by the content-delivery system and then delivered to clients in encrypted form. Clients then view the content using a secure rendering and/or display component that is capable of decrypting the content for authorized users. However, such theoretically secure content-delivery systems impose a considerable startup cost for the ordinary end-user because they are typically difficult to configure, require an understanding of advanced cryptographic concepts (e.g., public keys, private keys, certificates, etc.), and may not be flexible in the face of changes to the underlying hardware or software of the client computing system. Also, the inclusion of DRM technologies into an application can be prohibitively expensive to a content provider if non-open source or non-freeware solutions are incorporated.

In addition, many existing content representation formats are not capable of representing dynamic content or generating the dynamic display of information. For example, HTML only provides rudimentary facilities for representing dynamic presentation elements, such as animations. This inability to describe and represent dynamic presentation elements makes many content representation formats unsuitable for providing the user with an experience that is tailored to the particular attributes of the target user.

Furthermore, many content representation formats such as Microsoft Word are proprietary and/or opaque, and therefore suffer from a lack of readily available toolkits for programmatically processing and constructing seamless, customized content packages targeted to end-users. These properties can impose substantial barriers to entry and/or lock-in costs on content providers and/or end-users.

Also, the sheer proliferation of content representation formats causes substantial end-user confusion because they need to install, maintain, and upgrade a wide variety of players, renderers, viewers, or interpreters to display the wide variety of available content formats. Format proliferation also plagues the operators of content-delivery systems, because they need to install, manage, and upgrade an ever-increasing array of tools and systems for processing and maintaining source content. Operators of content-delivery systems may also be required to bear the cost of providing technical support and/or training for their users so that the users can effectively install the necessary software to view the various forms of delivered content.

DETAILED DESCRIPTION

Embodiments described herein provide methods and systems for the dynamic bundling of digital rights management controls with user interface components and content. Example embodiments provide a Dynamic Digital Rights Bundling System (DDRBS), which enables content providers to dynamically generate and deliver secured destination files (SDF) in response to client user (e.g., subscriber) requests. The secured destination files contain various functional components such as digital rights management controls and/or user interface components and/or content portions that may be displayed to authorized users by conforming interpreters, for example a media player or virtual machine operating in the context of a Web browser. Conforming interpreters may be implemented in software, hardware, or firmware or in any combination thereof. When an example SDF is rendered by a conforming interpreter, the digital rights management controls restrict access to some or all of the user interface components and/or some or all of the content portions. In one example embodiment, digital rights management controls to automatically restrict access are provided without any need to incorporate encryption and/or decryption processes such as those employed by typical symmetric or asymmetric encryption techniques. In addition, by generating secured destination files dynamically, user interface controls and/or content portions may be included that provide a user interface experience and/or content package that is customized to the attributes of the particular user, such as the user's computing environment, geographic location, subscription level, etc.

Figure 1:
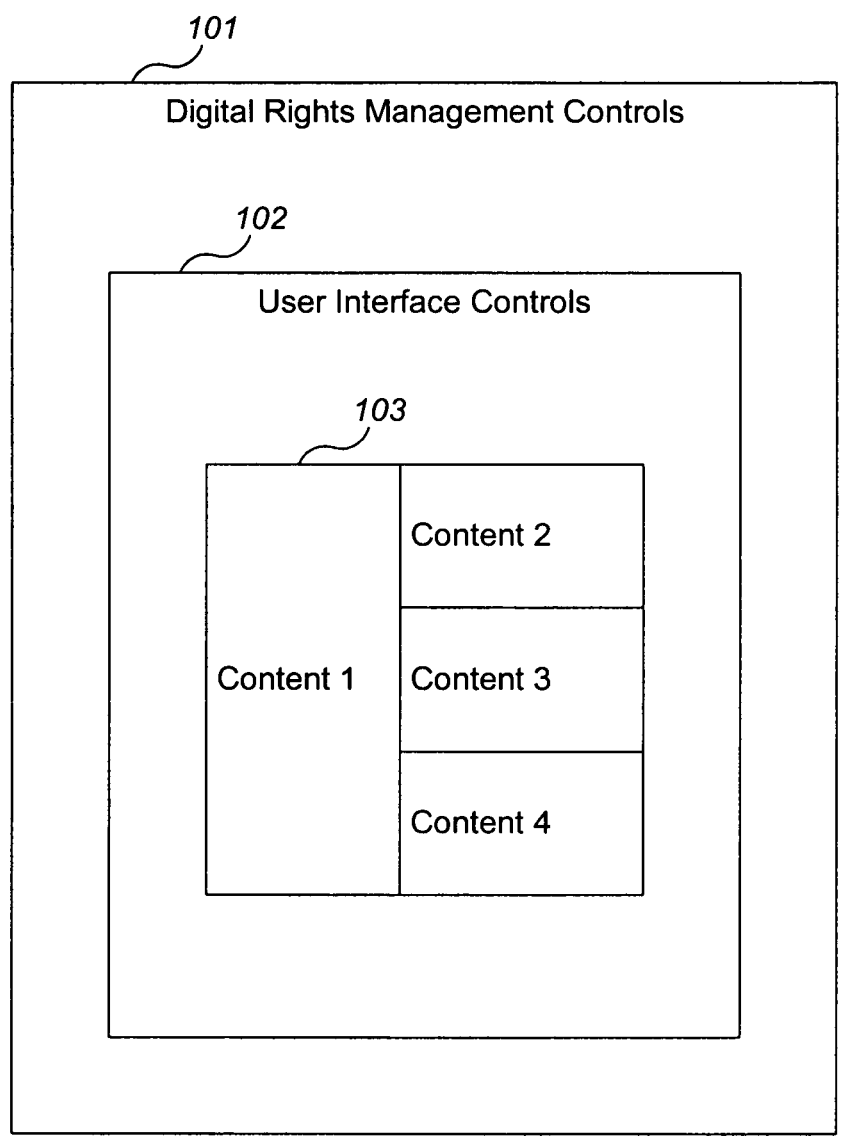
FIG. 1 is a block diagram of a logical view of an example secured destination file produced by an example Dynamic Digital Rights Bundling System.

FIG. 1 is a block diagram of a logical view of an example secured destination file produced by an example Dynamic Digital Rights Bundling System. In one embodiment, the secured destination file contains one or more digital rights management portions that implements digital rights management (DRM) controls, one or more user interface portions that implement user interface controls, and one or more content portions. The example secured destination file shown in FIG. 1 comprises DRM controls 101 that encapsulate user interface controls 102 that in turn manage the display and presentation of one or more content portions 103. Other arrangements are possible.

The digital rights management controls 101 limit access to other components of the secure destination file to authorized users. As used herein, the term "user" refers to a person, a program, or a system attempting to access one or more of the components of an SDF. Authorized users include any users that are by some means authorized to access one or more of the other portions contained in a given secured destination file. For example, an authorized user may be one who has paid for a subscription on a prior occasion, and then authenticated himself or herself to the DDRBS prior to or while requesting content. Alternatively, an authorized user may be a trial user that requests content and is allowed by the DRM portion to view content in a limited manner (e.g., a limited number of viewings, a limited time period, a limited functionality display lacking printing capability, etc.).

The user interface controls 102, in turn, provide functionality for displaying, presenting, browsing, paging, printing, or otherwise accessing and/or rendering the one or more content portions 103. The user interface controls 102 may also be customized to the particular user, class of user, or hardware or software environment associated with the user. For example, users paying for subscriptions may be provided secured destination files that contain user interface controls that support display and printing, whereas trial users may be provided secured destination files that only support display.

The one or more content portions 103 may contain various content types and combinations of content types, including text, images, audio, movies, and/or active content. Content portions may be generated dynamically, in order to provide users with content that is up-to-date with current conditions. For example, if a user requests a trail guide to a particular destination, the DDRBS may also provide an additional content portion that contains road or other travel conditions at the time of the request. Furthermore, content portions may be "active", in that they are self-updating with content based on some future current conditions, such as the time of the rendering of the secured destination file. For example, if a user requests a guide to a ski resort, the DDRBS may also provide an additional active content portion that fetches and displays snow and ski conditions at ski areas near the resort every time the user displays the secured destination file, an operation which may occur some time after the user has actually downloaded it.

A DDRBS provides numerous advantages. By incorporating user interface controls in the secured destination file, the DDRBS enables the provision of rich user interface experiences that are highly configurable and customizable on a per-user basis. For example, subscribers may be provided user interface controls that allow printing, whereas trial users may only be provided controls that allow viewing of the content for a limited number of sessions. In addition, by incorporating digital rights management controls into the secured destination file, the DDRBS enables the delivery of content to authorized users such that the content may not be shared with other, possibly unauthorized users. Also, the digital rights management controls may be customized for various user types, such as subscribers or trial users, and provide different levels of access or functionality. In addition, some embodiments provide digital rights management controls that are capable of preventing a large class of unauthorized operations by the user without relying on the use of symmetric or asymmetric encryption techniques, thus reducing complexity and cost.

Furthermore, by in some cases delaying the selection, translation, and/or generation of content and other portions until request time, the DDRBS enables a flexible content creation and delivery mechanism that allows convenient content updating. Moreover, the dynamic qualities of the DDRBS allow for the assembly of content packages that may be customized on a per-user basis. For example, trial users may be provided with advertising content in addition to the requested content. Users also may be provided with information tailored to the current conditions at the time of the request. For instance, in addition to receiving the requested content, a requesting user may be provided with current weather reports or other dynamically generated content that is relevant for the user's particular current location, or the location described by the requested content.

One should take note that the techniques of a DDRBS also may be useful to create a variety of other types of customized information packages. For example, DDRBS techniques may be used to produce directed marketing materials, travel guides, city guides, entertainment guides, outdoor activity guides, restaurant guides, educational resources, news magazines, information packets, research results, and multimedia presentations, etc.

The DDRBS provides secure destination files such as that illustrated in FIG. 1 in response to requests for desired content. Typically, the DDRBS initially receives an indication from a user containing a request for desired content. The desired content may, for example, be a trail guide for a particular outdoor destination. Based at least in part on the user's request, the DDRBS dynamically determines the bundle of portions that make up a particular SDF. A given bundle may include a number of dynamic portions, including digital rights management portions, user interface controls, interactive content, and active content portions that are operative to provide content based on the current conditions at some determined time (e.g., at the time of the display of other portions in the bundle). A bundle may also include static portions, including fixed text, images, or audio. Portions may also be dynamically generated at the time of the request. Dynamically generated portions include static content that is not generated until a response to a request is formulated. The DDRBS then translates the portions of the bundle into corresponding intermediate portions. By translating the portions into corresponding intermediate portions, the DDRBS generates a set of portions that are all in a uniform format. Next, the DDRBS merges the translated intermediate portions into a secured destination file, which is forwarded to the client user system to be rendered.

Figure 2:
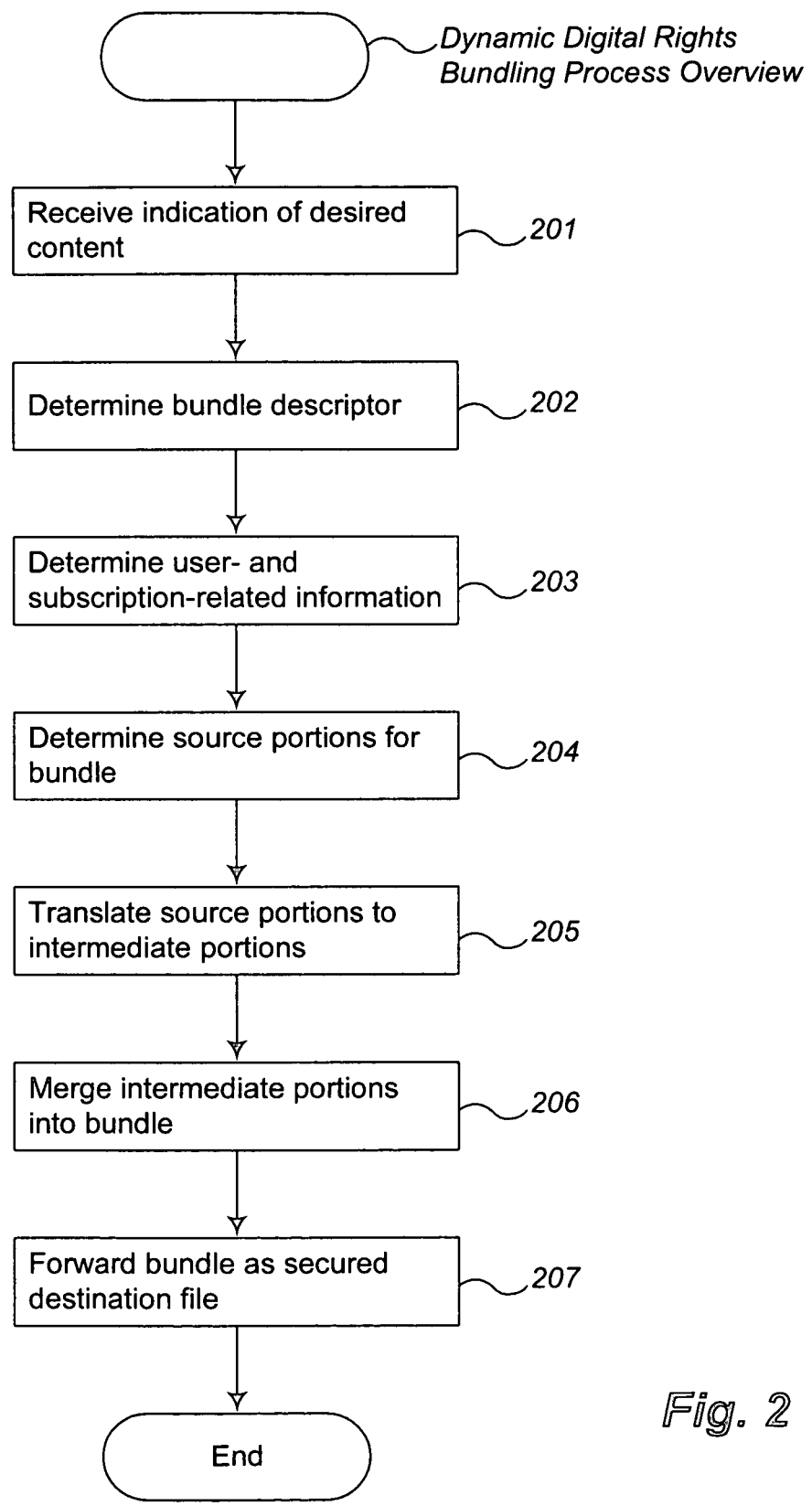
FIG. 2 is an example block diagram of an overview of an example process provided by a Dynamic Digital Rights Bundling System to produce a secured destination file.

FIG. 2 is an example block diagram of an overview of an example process provided by a Dynamic Digital Rights Bundling System to produce a secured destination file. Specifically, in step 201, the DDRBS receives an indication of desired content (e.g., from a user). Next, in step 202, the DDRBS determines a bundle descriptor. A bundle descriptor is a representation of a collection of portions that constitute a given bundle of portions. For example, an encoded string or a pointer to a descriptor table may be used. Bundle descriptor mappings are described further below, with respect to FIG. 3. In step 203, the DDRBS determines user- and subscription-related information. In step 204, the DDRBS determines a set of source portions. The determining of source portions may be based at least in part on the bundle descriptor determined in step 202 and the user- and subscription-related information determined in step 203. For example, in some embodiments, source content portions containing advertisements may be included for trial users. In other embodiments, source content portions containing coupons specific to particular businesses in particular cities may be included based on detecting that a user has selected a destination travel guide to a particular city. In other embodiments, the DDRBS may select user interface portions targeted to the particular hardware or software environment associated with the user. For example, if the user initiates the request from a handheld computing device, the DDRBS may detect this and provide user interface controls specialized to the limited display area of the handheld device. In step 205, the DDRBS translates the source portions in the set of source portions into corresponding intermediate portions. The format of the intermediate portions may be any format readily transformable into the final format of the secured destination file. In some cases, the intermediate portion format will be the same as the secured destination file format. In some embodiments, no intermediate portions are produced. In step 206, the DDRBS merges the intermediate portions created during step 205 into a secured destination file. The format of the secured destination file may be any format that can be interpreted by a client-side player, renderer, or interpreter in order to faithfully execute the DRM portion, user interface controls, or other functional or otherwise interactive components that are present in the secured destination file. The merging process conjoins multiple portions into a single, deliverable secured destination file. The merging process possibly also binds unresolved inter-portion references within the secured destination file. For example, the DRM controls located in one portion may make one or more references to particular user interface controls that are defined and/or reside in another portion of the secured destination file. Depending on the implementation and semantics of the target interpreter, player, or render, the merging process may resolve these references in order to provide a secured destination file that can be properly executed by the target player, renderer, or interpreter. The merging process may also perform additional processing (e.g., obfuscate, strip, compress, optimize, etc.) of the portions that make up the secured destination file. In step 207, the DDRBS forwards the secured destination file to the user, whereupon it may be stored for later use, or immediately played by an interpreter or player on the user's computing system.

Figure 3:
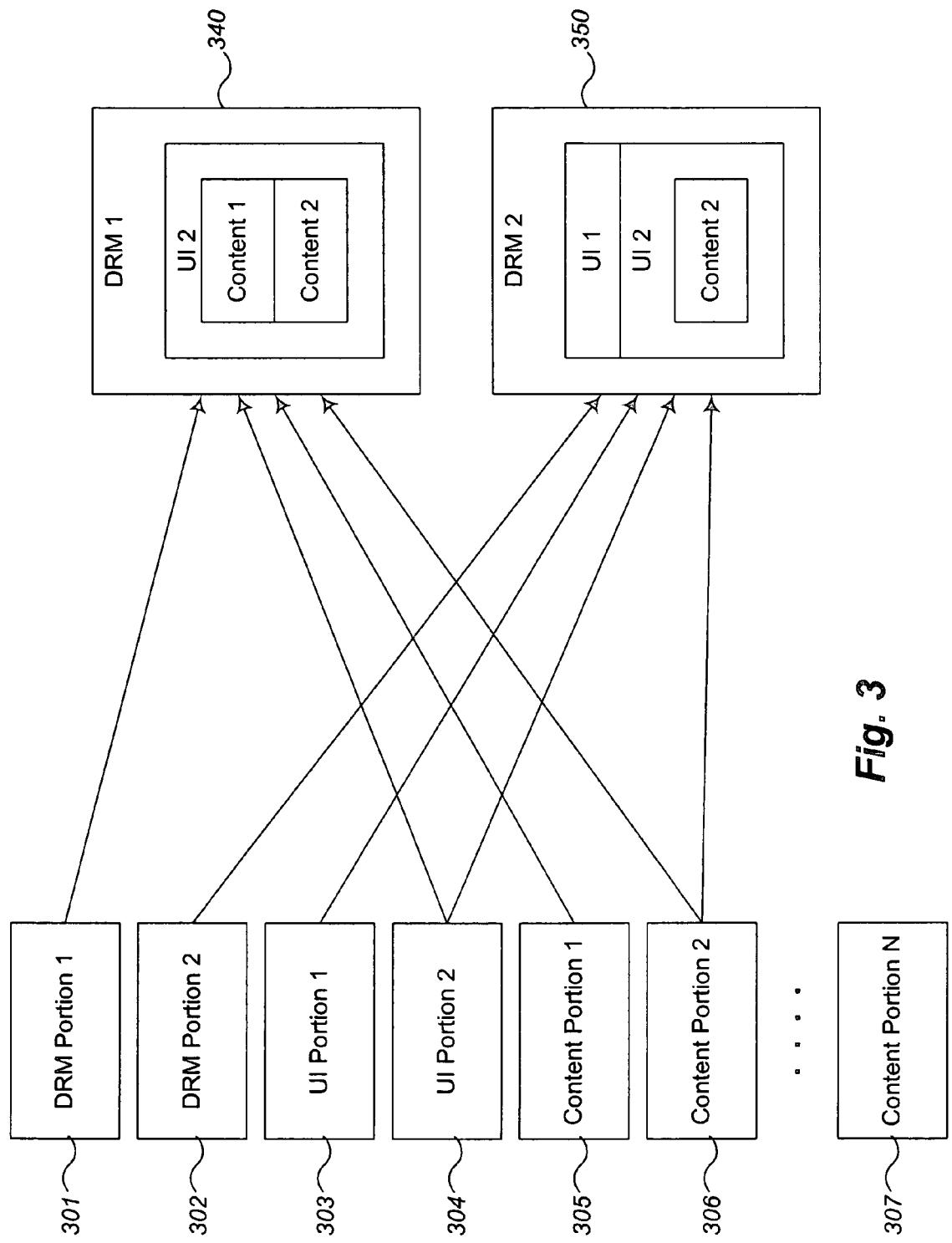
FIG. 3 is a diagram of example bundle description mappings between portions and resultant secured destination files.

FIG. 3 is a diagram of example bundle description mappings between portions and resultant secured destination files. This figure demonstrates a logical view of example associations between a group of example source portions 301-307 and a number of example secured destination files 340 and 350. Specifically, portions 301 and 302 represent two digital rights management portions. Different digital rights management portions may be employed to provide different levels or types of access controls. For example, digital rights management portion 301 may allow only a limited number of activations such as might be used to provide sample content to trial users, while digital rights management portion 302 may allow unlimited activation to authorized users. Portions 303 and 304 represent two user interface portions. Different user interface portions may be employed to provide different sets of user interface functionality targeted to different classes of user, content, software environment, or hardware environment. For example, user interface portion 303 may implement printing controls, while user interface portion 304 may implement standard display controls such as paging, zooming, and scrolling. Portions 305-307 represent three example content portions. As described with reference to Figures A and B, content portions may be static, dynamic, or active, and may contain a variety of content types, including text, images, sound, and movies (e.g., any content capable of digital representation). For example, content portion 305 may contain an advertising image, content portion 306 may contain a textual trail guide, and content portion 307 may contain a sound file. In addition, two example secured destination files 340 and 350 are shown. Secured destination file 340 comprises digital rights management portion 301, user interface portion 304, content portion 305, and content portion 306. Secured destination file 350 comprises digital rights management portion 302, user interface portions 303 and 304, and content portion 306. In this example, therefore, secured destination file 340 might be targeted to trial users and therefore contain a digital rights management portion 301 that does not allow unlimited viewing, basic user interface controls 304, textual trail guide content 306 in addition to an advertisement 305. Secured destination file 350, on the other hand, might be targeted to regular subscription users and therefore contain a digital rights management portion 302 that allows unlimited viewing, additional user interface controls 303 to support printing, and no advertising content.

Figure 4:
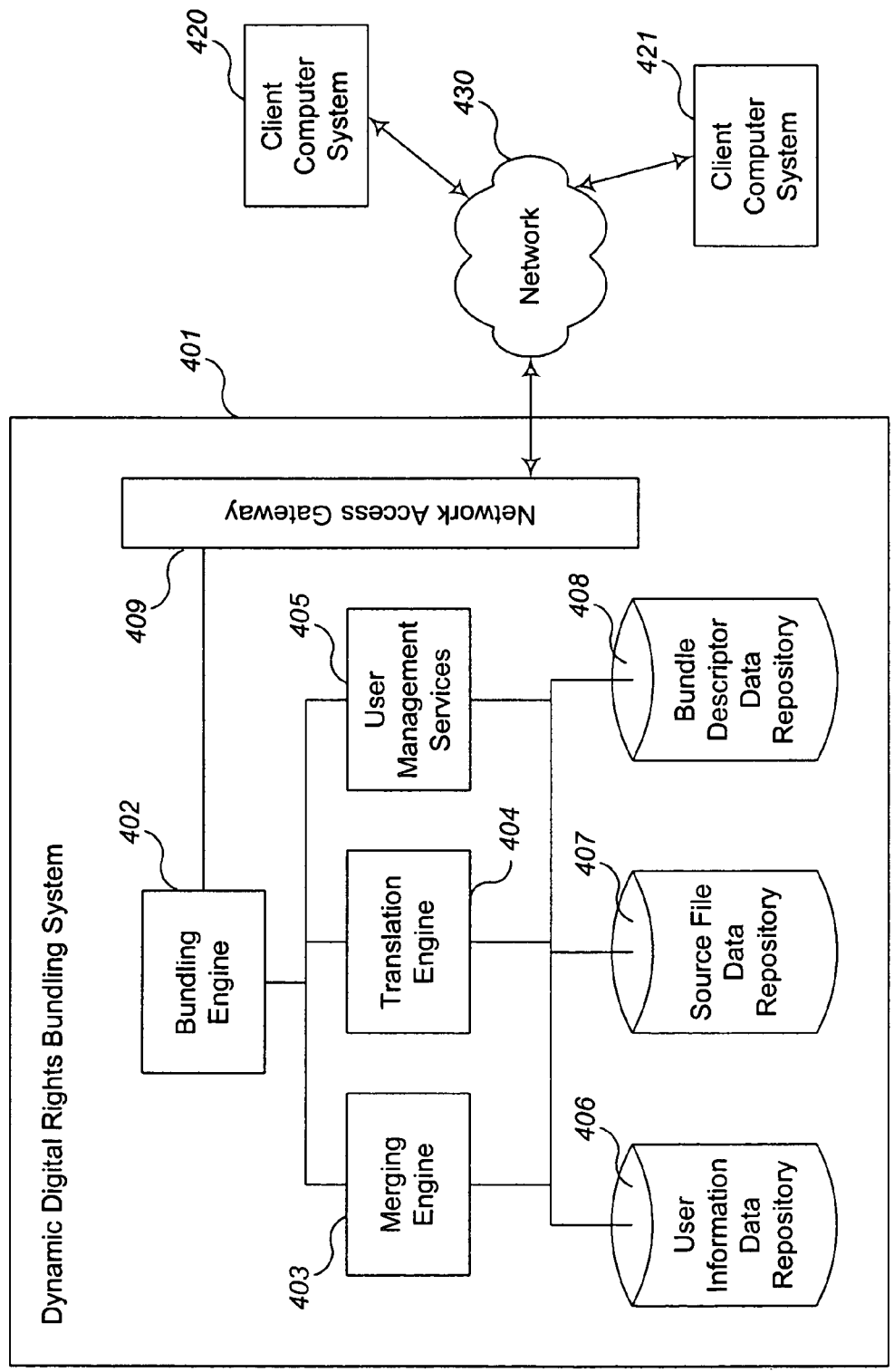
FIG. 4 is an example block diagram of the components of an example embodiment of a Dynamic Digital Rights Bundling System.

FIG. 4 is an example block diagram of components of an example embodiment of a Dynamic Digital Rights Bundling System. In one embodiment, a Dynamic Digital Rights Bundling System comprises one or more functional components/modules that work together to provide dynamic digital rights bundling. These components may be implemented in software, hardware, or firmware or in any combination thereof. In FIG. 4, a DDRBS 401 comprises a bundling engine 402, a merging engine 403, a translation engine 404, a user management services module 405, a user information data repository 406, a source file data repository 407, a bundle descriptor data repository 408, and a network access gateway 409. The network access gateway 409 receives indications of desired content (which may include indications of user identity or the computing system environment) from client computer systems 420 and 421 via a network 430 or other communication channel (not shown). Indications of desired content are forwarded to the bundling engine 402. The bundling engine 402 provides application logic for controlling the merging engine 403, the translation engine 404, and the user services management module 405. In one embodiment, the translation engine 404 receives an indication of desired content from the bundling engine 402. The translation engine 404 then determines the set of source portions to translate based on the indication of desired content by locating the appropriate bundle descriptor in the bundle descriptor data repository 408. Determining the set of source portions may also involve querying the user management services component 405 to obtain user- or subscription-related information based on the indicated user identity. The user management services module 405 may retrieve this information from the user information data repository 406, which generally stores information related to users and their subscriptions. Depending on the user- and subscription-related information, additional source portions may be included in the set of source portions. Having determined the set of source portions, the translation engine 404 retrieves the source portions from the source file data repository 407 and translates each source portion of the set of source portions into a corresponding intermediate portion. Upon completion, an indication of the set of intermediate portions is provided to the bundling engine 402. The bundling engine 402 then provides an indication of the set of intermediate portions to the merging engine 403. The merging engine 403 is responsible for conjoining the intermediate portions into a single secured destination file and possibly binding references between the intermediate portions contained within the secured destination file. Once the secured destination file has been generated, it is forwarded to one or more of the client computer systems 420 and 421 by the network access gateway component 409 via the network 430.

One should note that alternative arrangements and combinations of these components are equally contemplated for use with techniques described herein. For example, one or more of the illustrated components may not be present in a particular embodiment of the DDRBS. Also, the user information data repository 406, source file data repository 407, and bundle descriptor data repository 408 may all be merged into a single data repository, or alternately decomposed in a different manner. In addition, the functional components such as the bundling engine 402, merging engine 403, translation engine 404, and user management services 405 may all be merged into a single, monolithic component or alternately decomposed in a different manner. For example, the bundling engine may be responsible for determining the set of source portions, while the translation engine may be responsible only for translating provided source portions. Furthermore, the network access gateway 409 communicating via a network 430 is but one means of facilitating inter-process communication between or within computer systems. For example, the client computer system 420 and the entire DDRBS 401 could be located on a single physical computer system, with the various components communicating with each other and the client system via procedure calls, method invocations, pipes, sockets, or other communication techniques known in the art.

Example embodiments described herein provide applications, tools, data structures and other support to implement a DDRBS to be used for the dynamic bundling and delivery of outdoor activity and travel guides. Other embodiments of the described techniques may be used for other purposes, including for the dynamic generation and delivery of various sorts of information packages, for example, customized educational materials, research results, entertainment guides, targeted marketing materials, and so on. Also, although certain terms are used primarily herein, one skilled in the art will recognize that other terms could be used interchangeably to yield equivalent embodiments and examples. In addition, terms may have alternate spellings which may or may not be explicitly mentioned, and one skilled in the art will recognize that all such variations of terms are intended to be included. In the following description, numerous specific details are set forth, such as data formats and code sequences, etc., in order to provide a thorough understanding of the described techniques. However, the present techniques also can be practiced without some of the specific details described herein, or with other specific details, such as changes with respect to the ordering of the code flow or different code flow.

Figure 5:
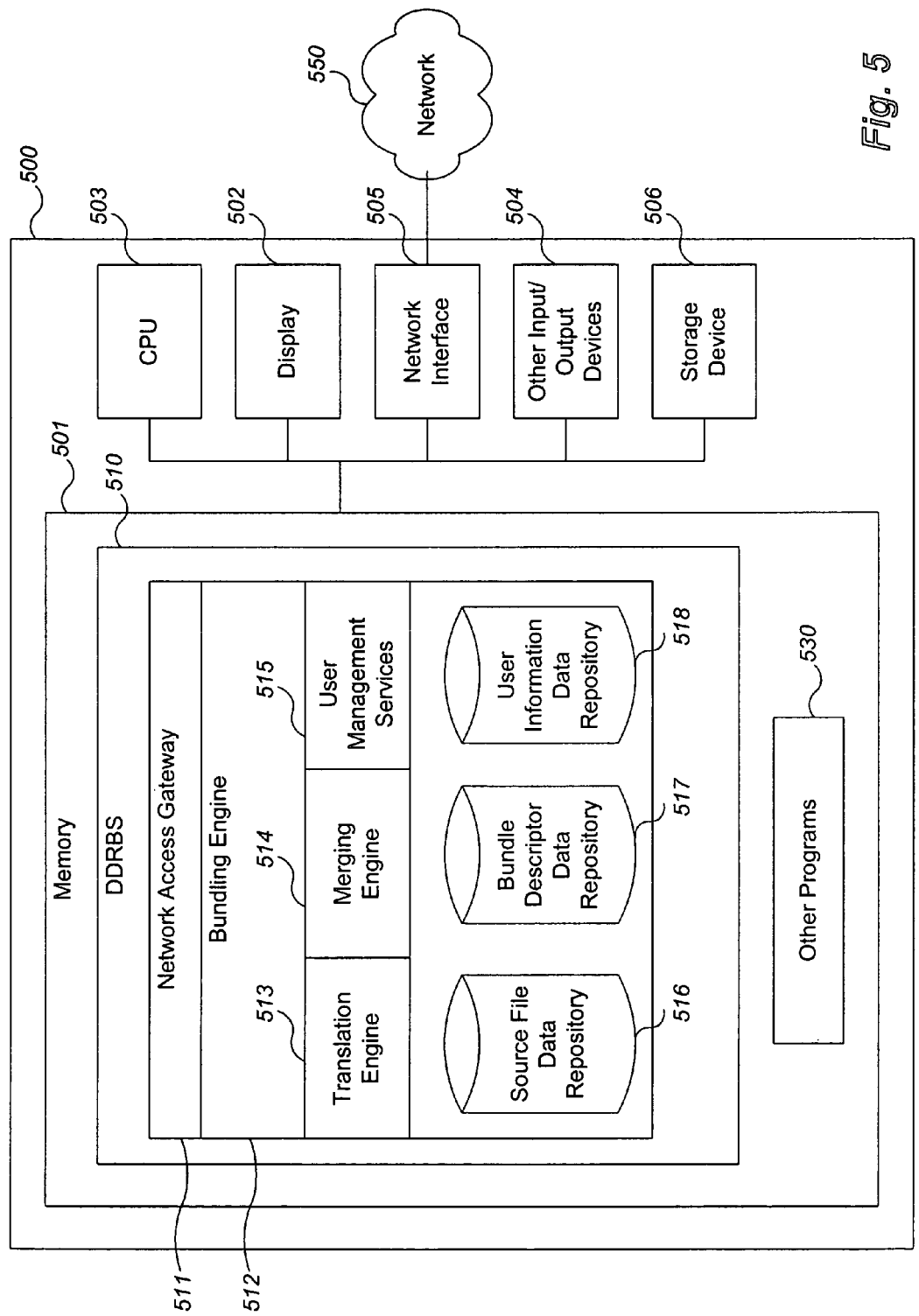
FIG. 5 is an example block diagram of a general-purpose computer system for practicing example embodiments of a Dynamic Digital Rights Bundling System.

FIG. 5 is an example block diagram of a general-purpose computer system for practicing example embodiments of a Dynamic Digital Rights Bundling System. The general-purpose computer system 500 may comprise one or more server and/or client computing systems and may span distributed locations. In addition, each block shown may represent one or more such blocks as appropriate to a specific embodiment or may be combined with other blocks. Moreover, the various blocks of the DDRBS 510 may physically reside on one or more machines, which use standard or proprietary inter-process communication mechanisms to communicate with each other.

In the embodiment shown, computer system 500 comprises a computer memory ("memory") 501, a display 502, a Central Processing Unit ("CPU") 503, a network interface 505, a storage device 506, and other Input/Output ("IO") devices 504. The DDRBS 510 is shown residing in the memory 501. The components of the DDRBS 510 preferably execute on CPU 503. As described in FIG. 4, an example DDRBS comprises a bundling engine 512, translation engine 513, merging engine 514, user management services component 515, source file data repository 516, bundle descriptor data repository 517, user information data repository 518, and a network access gateway 511. Other programs 530 also reside in the memory 501, and preferably execute on the one or more CPU's 503.

In an example embodiment, components of the DDRBS 510 are implemented using standard programming techniques. A range of programming languages known in the art may be employed for implementing an example embodiment of the DDRBS, including representative implementations of various programming language paradigms, including, but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc. In addition, the various components of the DDRBS 510 may be implemented by way of a single monolithic executable running on a single CPU computer system, or alternately decomposed using a variety of structuring techniques known in the art, including, but not limited to, multi-programming, multithreading, client-server, or peer-to-peer, running on one or more computer systems each having one or more CPUs.

In addition, programming interfaces to the data stored as part of the DDRBS 510 can be made available by standard means such as through C, C++, C#, and Java APIs or libraries for accessing files, databases, or other data repositories, or through Web servers, FTP servers, or other types of servers providing access to stored data. The source data file repository 516, bundle descriptor data repository 517, and user information data repository 518 may be implemented by means of one or more database systems, file systems, or any other method known in the art for storing such information, or any combination of the above.

Also, the DDRBS 510 may be implemented in a distributed environment that is comprised of multiple, even heterogeneous, computer systems and networks. In addition, different configurations and locations of code and data are contemplated for use with techniques of the present invention. For example, in one embodiment, the components 511-515 and data repositories 516-518 are all located in physically different computer systems. In another embodiment, various components 511-515 are hosted together on one server machine, while the data repositories 516-518 are all hosted on a separate server machine. A variety of distributed computing techniques are appropriate for implementing the components of a DDRBS in a distributed manner including, but not limited to, TCP/IP sockets, RPC, RMI, HTTP, and Web Services (XML-RPC, JAX-RPC, SOAP, etc.). In some embodiments, one or more of the components 511-515 and data repositories 516-518 may be implemented in the context of, or provided by, known or proprietary Web servers (e.g., Apache HTTP Server, Microsoft Internet Information Server™, Sun® Java System Web Server, etc.) and/or database systems (e.g., MySQL®, Microsoft SQL Server™, Oracle®, etc.) and/or other client-server or multi-tiered application frameworks. In addition, in some embodiments, client computing systems may display and otherwise access the provided secured destination files by means of web clients such as Microsoft Internet Explorer™, Mozilla Firefox®, Netscape®, Opera®, Apple Safari™, etc. Other variations are possible.

In example embodiments, the various components may execute concurrently and asynchronously; thus the components may communicate using known or proprietary message passing techniques. Equivalent synchronous embodiments are also supported by a DDRBS implementation. Also, other steps could be implemented for each routine, and in different orders, and in different routines, yet still achieve the functions of the DDRBS. For example, the DDRBS 510 need not necessarily communicate with client users (not shown) by way of a network interface 505 coupled to a network 550. The client computing system that makes requests of the DDRBS 510 may in fact be located on the same physical machine as the DDRBS 510 and may communicate with the DDRBS by other known or proprietary means of inter-process communication, such as sockets, messages, pipes, signals, files, procedure calls, or method invocations.

Figure 6:
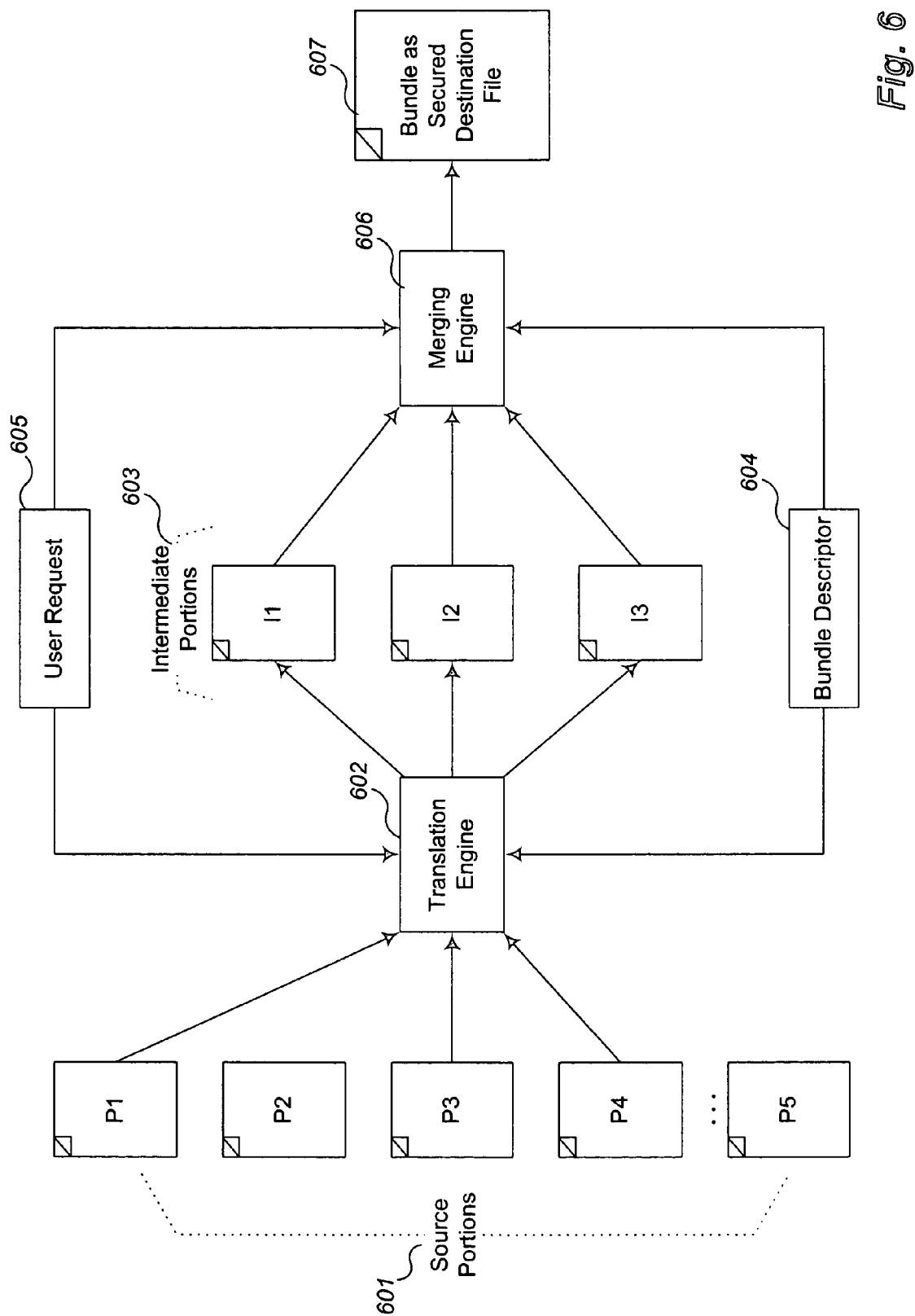
FIG. 6 is an example data flow diagram of how the components of an example Dynamic Digital Rights Bundling System interact in one embodiment to provide secured destination files.

As described with reference to FIG. 2, a DDRBS takes as input a request for desired content and produces a secured destination file. FIG. 6 is an example data flow diagram of how the components of an example Dynamic Digital Rights Bundling System interact in one embodiment to provide secured destination files. In this embodiment, the translation engine 602 receives a user request 605 and a bundle descriptor 604 as inputs. An example bundle descriptor is described with reference to FIG. 8. Based on these inputs, the translation engine 602 determines a set of source portions 601 and then translates them into corresponding intermediate portions 603. The source portions may be in a variety of formats. By translating the source portions into intermediate portions, the DDRBS generates a set of portions that are all in a uniform format. The merging engine 606 may also receive the user request 605 and a bundle descriptor 604 as inputs. The merging engine 606 then merges the set of intermediate portions 603 into a secured destination file 607. Merging unifies multiple intermediate files into a single, secured destination file.

Figure 7:
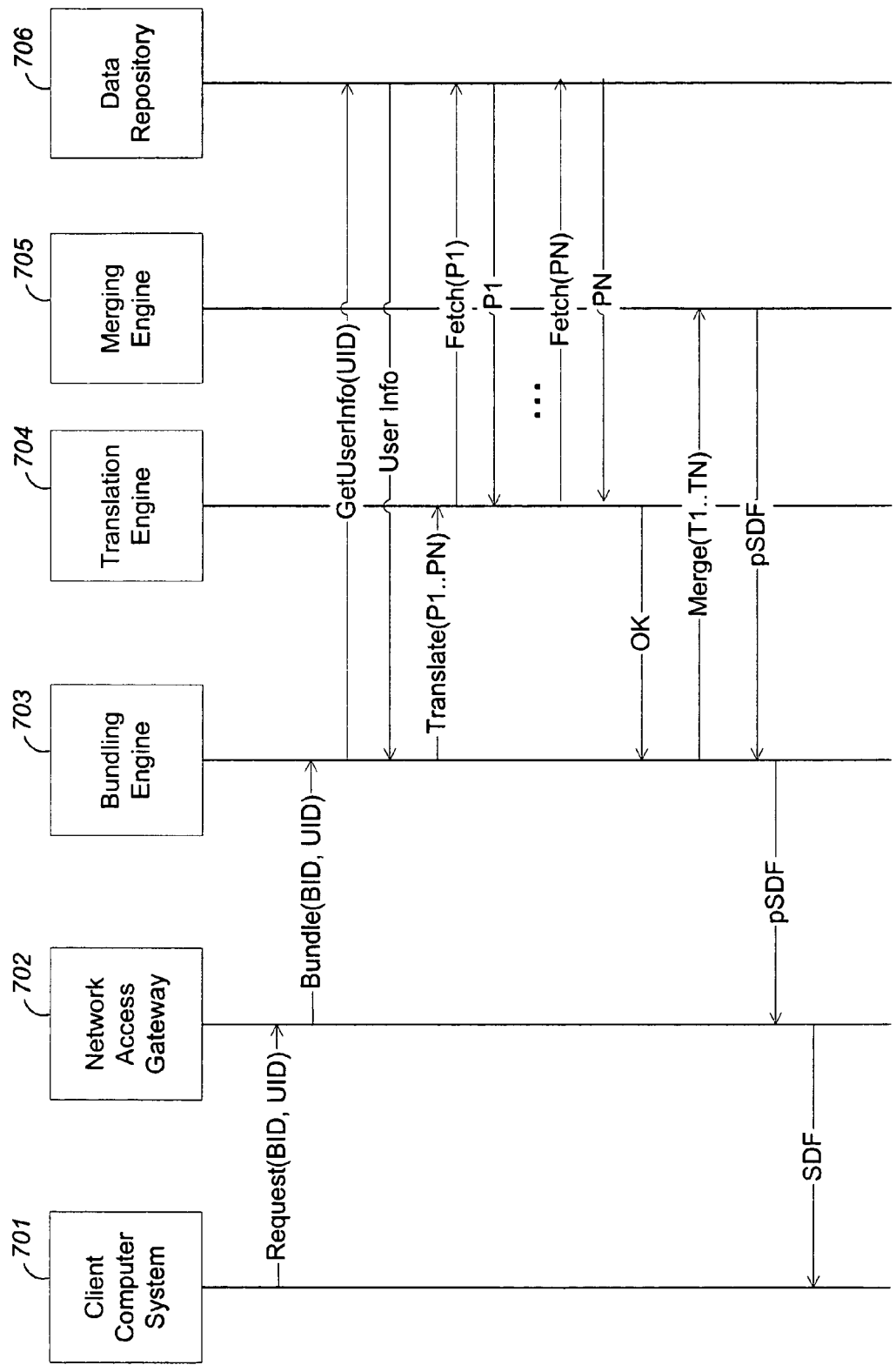
FIG. 7 is an example interaction diagram for the components of an example embodiment of a Dynamic Digital Rights Bundling System.

FIG. 7 is an example interaction diagram for the components of an example embodiment of a Dynamic Digital Rights Bundling System. In this embodiment, a client computer system 701 and five components of an example DDRBS and the example messages passed between them are shown. Initially, the client computer system 701 forwards a request to the network access gateway 702. In this case, the request contains an indication of a user identifier (UID) and a desired content bundle identifier (BID). The network access gateway 702 interprets this request and directs the bundling engine 703 to create a secured destination file corresponding to the desired content and possibly specialized for the indicated user. Next, the bundling engine 703 queries the data repository 706 for user information stored for the indicated user. The bundling engine 703 then determines the set of source portions P1 . . . PN and optionally directs the translation engine 704 to translate these portions into intermediate portions. Next, the translation engine 704 fetches the stored source portions from the data repository 706 and translates them into corresponding intermediate portions. When finished translating, the translation engine 706 indicates completion to the bundling engine 703. Next, the bundling engine 703 directs the merging engine 705 to merge the intermediate source portions T1 . . . TN. The merging engine conjoins and possibly binds the intermediate source portions and returns an indication of a secured destination file to the bundling engine 703. The indication of the secured destination file is then forwarded from the bundling engine 703 to the network access gateway 702. The network access gateway 702 ultimately forwards the secured destination file to the client computer system 701 that initiated the original request.

Figure 8:
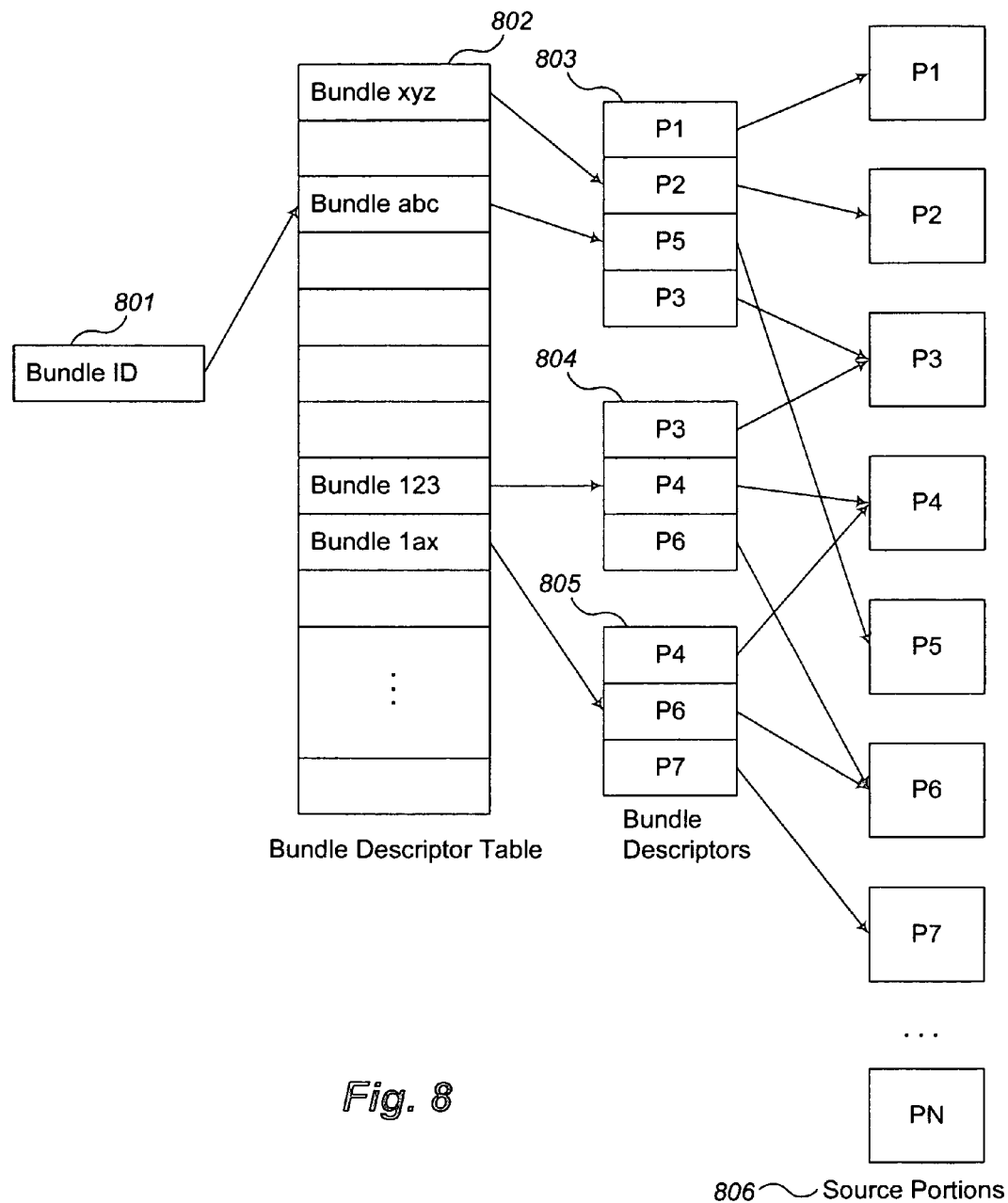
FIG. 8 is an example block diagram of a bundle descriptor table as used by an example embodiment of a Dynamic Digital Rights Bundling System.

FIG. 8 is an example block diagram of a bundle descriptor table as used by an example embodiment of a Dynamic Digital Rights Bundling System. A bundle descriptor table is an example of a data structure that may be used by a DDRBS to represent bundle description mappings as illustrated in FIG. 3. In this example, the bundle descriptor table 802 is implemented as a lookup table that maps bundle identifiers such as bundle identifier 801 to bundle descriptors. Three example bundle descriptors 803, 804, 805 are shown. Each bundle descriptor contains a number of indications of source portions 806. In this example, bundle identifier 801 is looked up in the bundle descriptor table 802. There, a correspondence between the value of bundle identifier 801 and bundle descriptor 803 is located. Bundle descriptor 803, in turn contains references to four source portions 806. In particular, bundle descriptor 803 refers to source portions P1, P2, P5, and P3. Other types of indicators of portions and other data structures may be equivalently incorporated into the techniques described herein. For example, mappings could be represented by way of alternate linked memory cell arrangements, matrices, database tables, rule-based build facilities such as "make," or other techniques known in the art. In addition, even though all of the shown bundle descriptors appear to indicate physically present portions, it is possible to indicate portions that are to be dynamically generated at request time.

Figure 9:
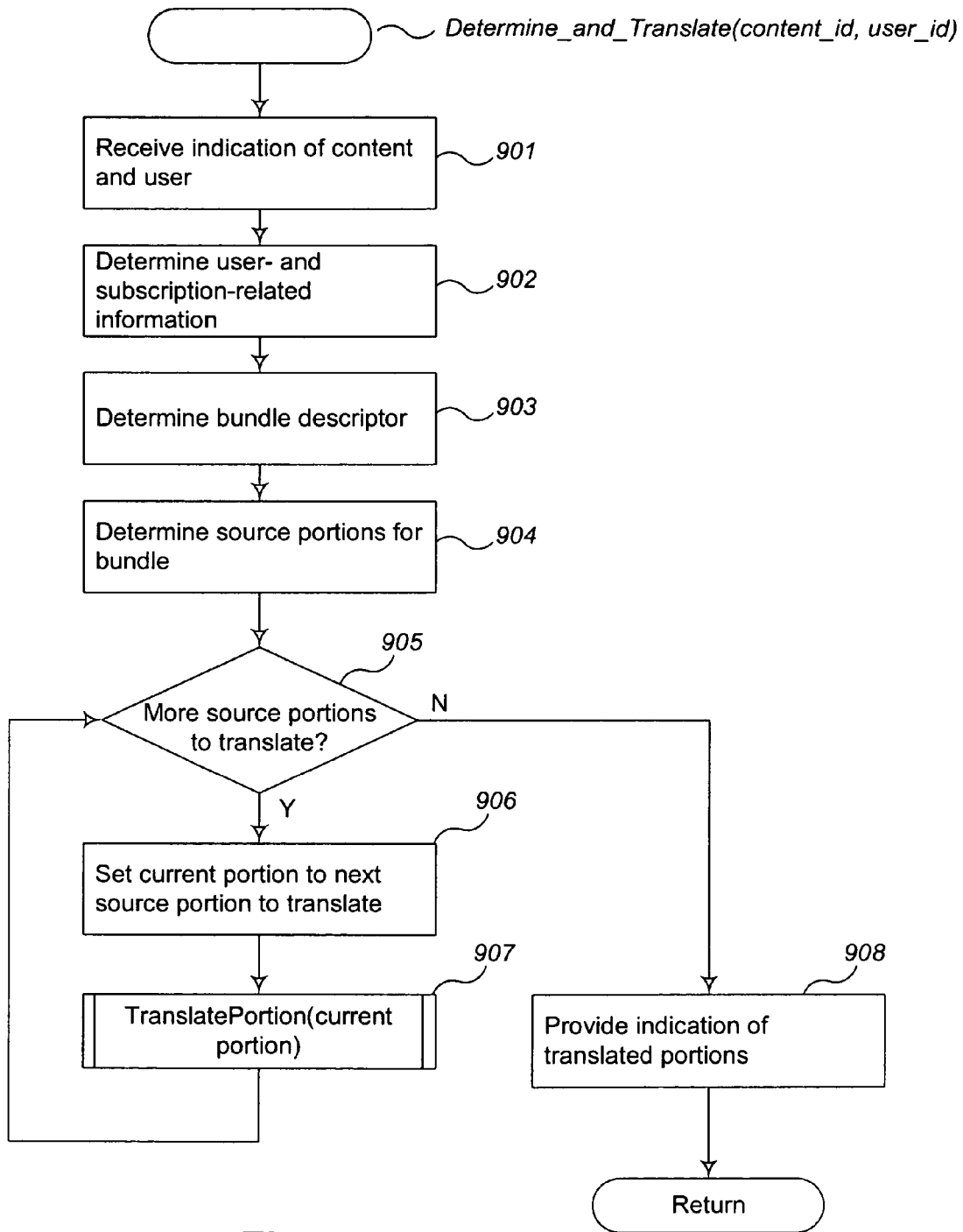
FIG. 9 is an example flow diagram of a Determine$_{13}$ and$_{13}$ Translate routine used to determine source portions of a bundle and translate them into corresponding intermediate portions.

As described with reference to FIG. 2, the DDRBS engine determines a set of portions based on a designated bundle descriptor and a designated user and then translates them to an intermediate format. FIG. 9 is an example flow diagram of a Determine$_{13}$ and$_{13}$ Translate routine used to determine source portions of a bundle and translate them into corresponding intermediate portions. This routine may be provided by, for example, the translation engine 402, the bundling engine 404, or a combination of both components as described with reference to FIG. 4.

Specifically, in step 901, the routine receives an indication of desired content and the requesting user. The designation of input to the routine may be implemented by a variety of methods known in the art, including, but not limited to, parameter passing, message passing, signals, sockets, pipes, streams, and files. In step 902, the routine determines user- and subscription-related information. The routine may perform this aspect by making requests of one or more data repositories, such as the user information data repository 406 of FIG. 4. In addition, some user information may be included in the designated indication of the user received in step 901. For example, the indication of user may contain location-based information related to the current geographic location of the user at the time of the request. In step 903, the routine determines a bundle descriptor corresponding to the designated requested content. The routine may determine the bundle descriptor by means of a bundle descriptor table as described with reference to FIG. 8, by querying a bundle descriptor data repository 406 as described with reference to FIG. 4, or by other means known in the art. In step 904, the routine determines the set of source portions for the bundle. Again, the routine may determine the set of source portions by means of a bundle descriptor table, by querying a bundle descriptor data repository, or by other means known in the art. In addition, determining the set of source portions may include automatically generating any source portions that contain dynamic content. For example, a source portion may include current weather conditions, movie show times, traffic conditions or other data that does not have a static lifetime. In such cases, the content may be generated in an "on-the-fly" manner, such as at the time of the determination of the set of source portions. In addition, determining the set of source portions may include creating or otherwise configuring active content portions, which are capable of acquiring and/or updating displayable content at some time after the set of source portions has been determined, such as when the user actually displays the active content portion. Next, the routine executes a loop in steps 905-907 to process each source portion. In step 905, the routine determines whether there are more source portions to translate. If so, the routine proceeds to step 906 and sets the current portion to be translated to the next source portion in the set of source portions. In step 907, the routine invokes the TranslatePortion routine and designates the current portion as the portion to translate. The TranslatePortion routine is described below with respect to FIG. 10. Afterwards, the routine continues to the beginning of the loop in step 905 to process additional source portions until none remain. When it is determined in step 905 that there are no more source portions to translate, the routine continues to step 908 and provides an indication of the translated source portions.

Figure 10:
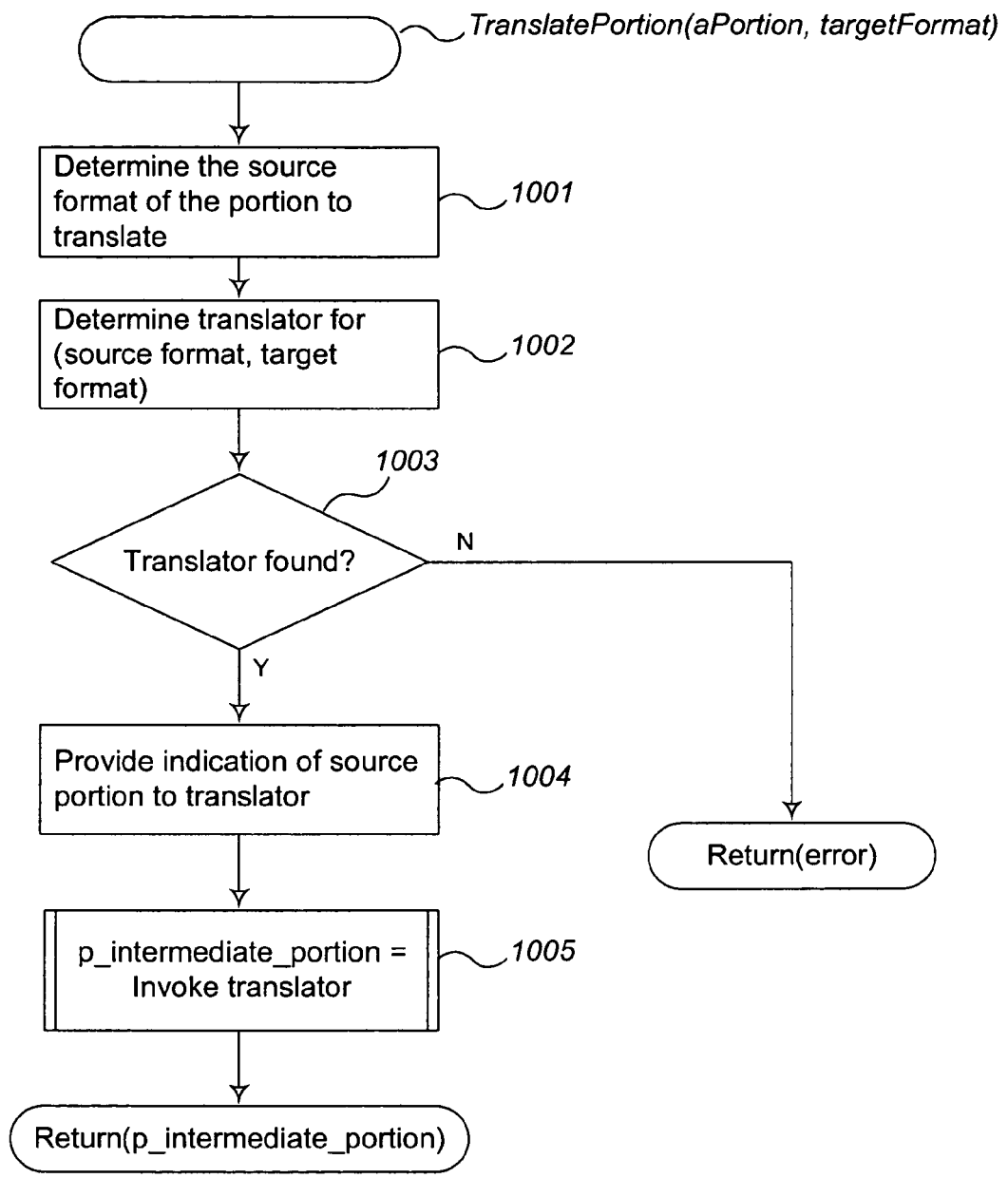
FIG. 10 is an example flow diagram of a TranslatePortion routine used to translate an individual source portion into a corresponding intermediate portion.

As described with reference to FIG. 9, the Determine$_{13}$ and$_{13}$ Translate routine determines source portions of a bundle and translates them into corresponding intermediate portions. FIG. 10 is an example flow diagram of a TranslatePortion routine used to translate an individual source portion into a corresponding intermediate portion. The routine may be provided by the translation engine 404 as described with reference to FIG. 4 and may be invoked by the Determine$_{13}$ and$_{13}$ Translate routine as described with reference to FIG. 9. In step 1001, the routine determines the source format of the designated portion to translate. The source format may be any known or proprietary data or text file format that may be used to represent information. Example source file formats include, but are not limited to, Microsoft Word, Portable Document Format (PDF), Word Perfect, XML, HTML, text, Java, C, C++, C#, Perl, Python, ActionScript, VBScript, or JavaScript. The file format of a designated source file (a portion) may be represented by a number of means known in the art, including file name extensions, magic numbers, meta-data included in the file itself, or meta-data resident in the bundle descriptor or other data repository maintained by the DDRBS. In step 1002, the routine determines a translator that is capable of translating the designated source format into a pre-determined target format. This determination may be made by way of a format translator table as described with reference to FIG. 11 or by other means. A translator is a functional entity that is capable of translating a source portion into an intermediate portion. Translators may be implemented by way of external programs, stored procedures, closures, functions, methods, or other techniques known in the art. Translators may specialize in translating one or more source portion formats into one or more intermediate portion formats. For example, in one embodiment, one translator may be capable of translating the PDF format into Shockwave™ Flash (SWF) format. A different translator may be required to translate Java™ source code or Java™ bytecode into SWF, and yet another translator may be required to translate the Microsoft Word™ format into SWF format. In step 1003, the routine determines whether an appropriate translator was found. If so, the routine continues to step 1004 and provides an indication of the source portion to the translator. Next, in step 1005, the routine invokes the translator and receives an indication of the intermediate portion as provided by the translator. Finally, the routine ends by returning an indication of the intermediate portion. If it was instead determined in step 1003 that no appropriate translator could be found, the routine ends by returning an indication of an error condition.

Figure 11:
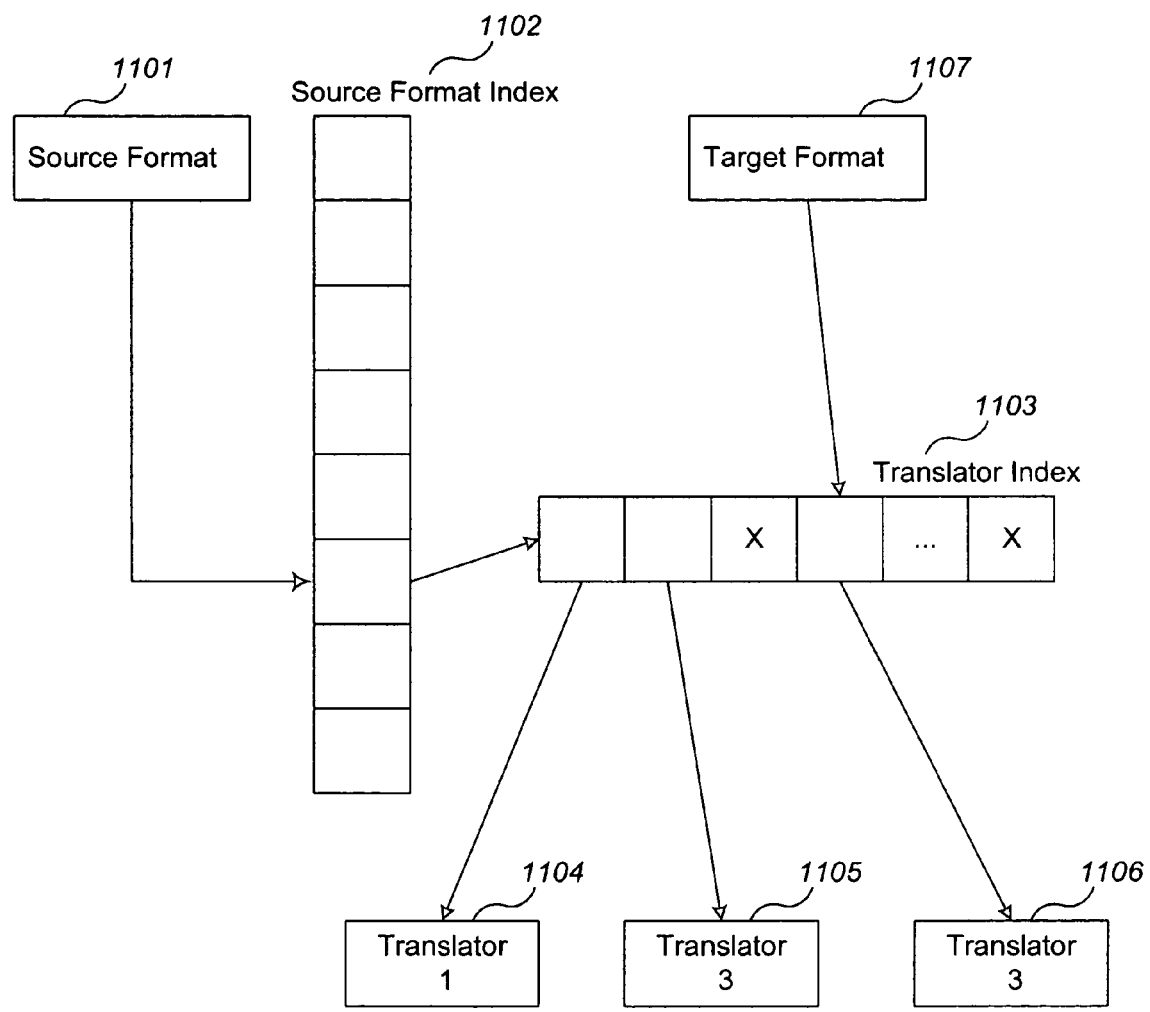
FIG. 11 is an example block diagram of a format translator table used to determine appropriate translators for designated source and target formats.

FIG. 11 is an example block diagram of a format translator table used to determine appropriate translators for designated source and target formats. This table may be used, for example, by the TranslatePortion routine described with reference to FIG. 10. The format translator table comprises a source format index 1102, which acts as a lookup table that maps a designated source format 1101 to a translator index 1103. The translator index 1103 may then be used as a lookup table that maps a designated target format 1107 to a translator 1106. Two other translators 1104 and 1105 are also shown in the figure. Note that a mapping from a source and target format to an appropriate translator may be represented by a variety of means. For example, such a mapping could be represented by way of alternate linked memory cell arrangements, matrices, database tables, property files, or other techniques known in the art.

Figure 12:
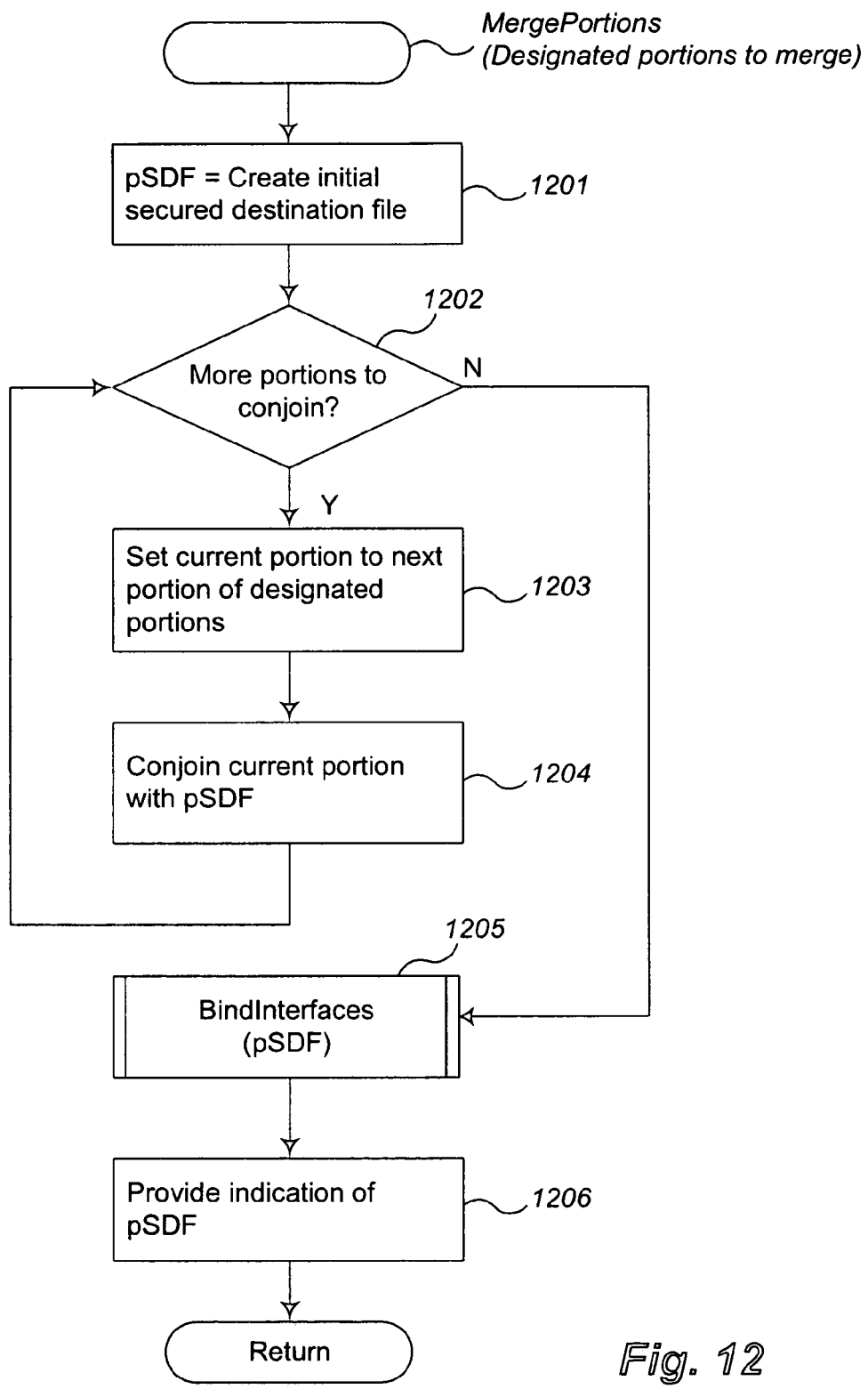
FIG. 12 is an example flow diagram of a MergePortions routine used to merge intermediate portions into a secured destination file.

As described with reference to FIG. 2, the DDRBS merges a set of translated, intermediate portions into a bundle of portions that may be forwarded as a secured destination file. FIG. 12 is an example flow diagram of a MergePortions routine used to merge intermediate portions into a secured destination file. This routine may be provided by, for example, the merging engine 403 described with reference to FIG. 4. The routine initially receives a designation of the intermediate portions to be merged. The designation of input to the routine may be implemented by a variety of methods known in the art, including, but not limited to, parameter passing, message passing, signals, sockets, pipes, streams, and files. In step 1201, the routine creates an initial secured destination file. This file may be initially empty, or alternately populated with some default content or functional portion(s). In steps 1202-1204, the routine executes a loop to conjoin each designated portion. Specifically, in step 1202, the routine determines whether there are more intermediate portions to conjoin. If so, the routine continues to step 1203 where it sets the current portion to the next portion of the designated intermediate portions to be merged. In step 1204, the routine conjoins the current portion with the secured destination file. Conjoining a portion with the secured destination file includes copying or otherwise transferring the data from the portion into the secured destination file. In addition, conjoining may include optionally performing processing or other manipulation of the data as it is transferred or copied into the secured destination file. The routine returns to the beginning of the loop in step 1202 to conjoin intermediate portions until there are no more intermediate portions to conjoin. When it is determined in step 1202 that there are no more portions to conjoin, the routine continues to step 1205 and invokes the BindInterfaces routine. The BindInterfaces routine binds inter-portion references between the portions conjoined in the secured destination file. The BindInterfaces routine is described further with reference to FIG. 14. After the BindInterfaces routine ends, the MergePortions routine ends by providing an indication of the secured destination file in step 1206, and returns.

Figure 13:
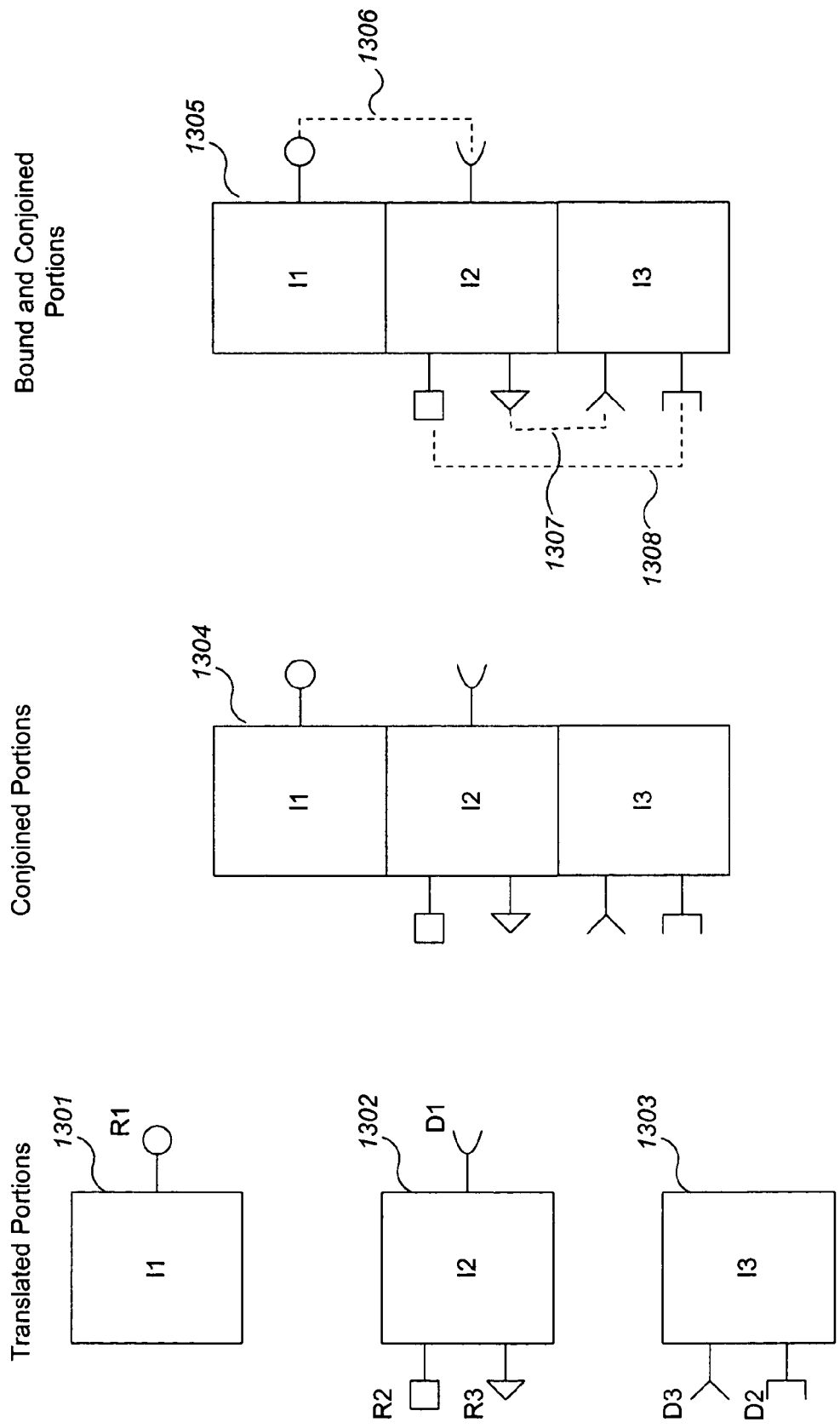
FIG. 13 is an example block diagram depicting the conjoining and binding of a number of example portions.

FIG. 13 is an example block diagram depicting the conjoining and binding of a number of example portions. This figure depicts a data-centric view of the conjoining and binding process performed by the MergePortions routine described with reference to FIG. 12. Conjoining is the process by which one or more portions are copied or otherwise transferred into a secured destination file. Binding is the resolution of names to their definitions. Within a particular portion, every reference to a name that is not defined within that portion must be resolved to a definition located in some other portion. A reference is a location in a portion of the secured destination file that uses or otherwise refers to a name or other value that is defined elsewhere in the secured destination file. A definition is a location in a portion of a secured destination file that defines a name or other value that may be referred to by references located elsewhere in the secured destination file. This resolution may be accomplished through various means, including replacing external references with numerical addresses or offsets into the secured destination file. In some embodiments, the merging process does not require the static binding of references to their definitions. If the client computing component that processes the secured destination file (e.g., interpreter, player, etc.) provides a mechanism for dynamic binding, then the resolution of references to definitions may be delayed until such a time as the secure destination file is processed by the client. In such embodiments, the DDRBS may elect not to perform binding because the runtime environment of the client system will implicitly provide it.

In the example depicted in FIG. 13, there are initially three intermediate portions 1301, 1302, and 1303. Portion 1301 contains one reference R1. Portion 1302 contains two references R2 and R3, and one definition D1. Portion 1303 contains two definitions, D2 and D3. After the portions are conjoined by, for example, the MergePortions routine described with reference to FIG. 12, an unbound secured destination file 1304 is created. In the unbound secured destination file 1304, the formerly separate intermediate portions are physically connected into a single data unit, but the references have yet to be bound to their respective definitions. Upon binding by, for example, the BindInterfaces routine described with reference to FIG. 14, the references are bound to their respective definitions, resulting in the secured destination file 1305. The dashed lines 1306, 1307, and 1308 indicate the bindings that have been formed between references and their respective definitions. In this example, reference R1 has been bound to definition D1, reference R2 has been bound to definition D2, and reference R3 has been bound to definition D3.

Figure 14:
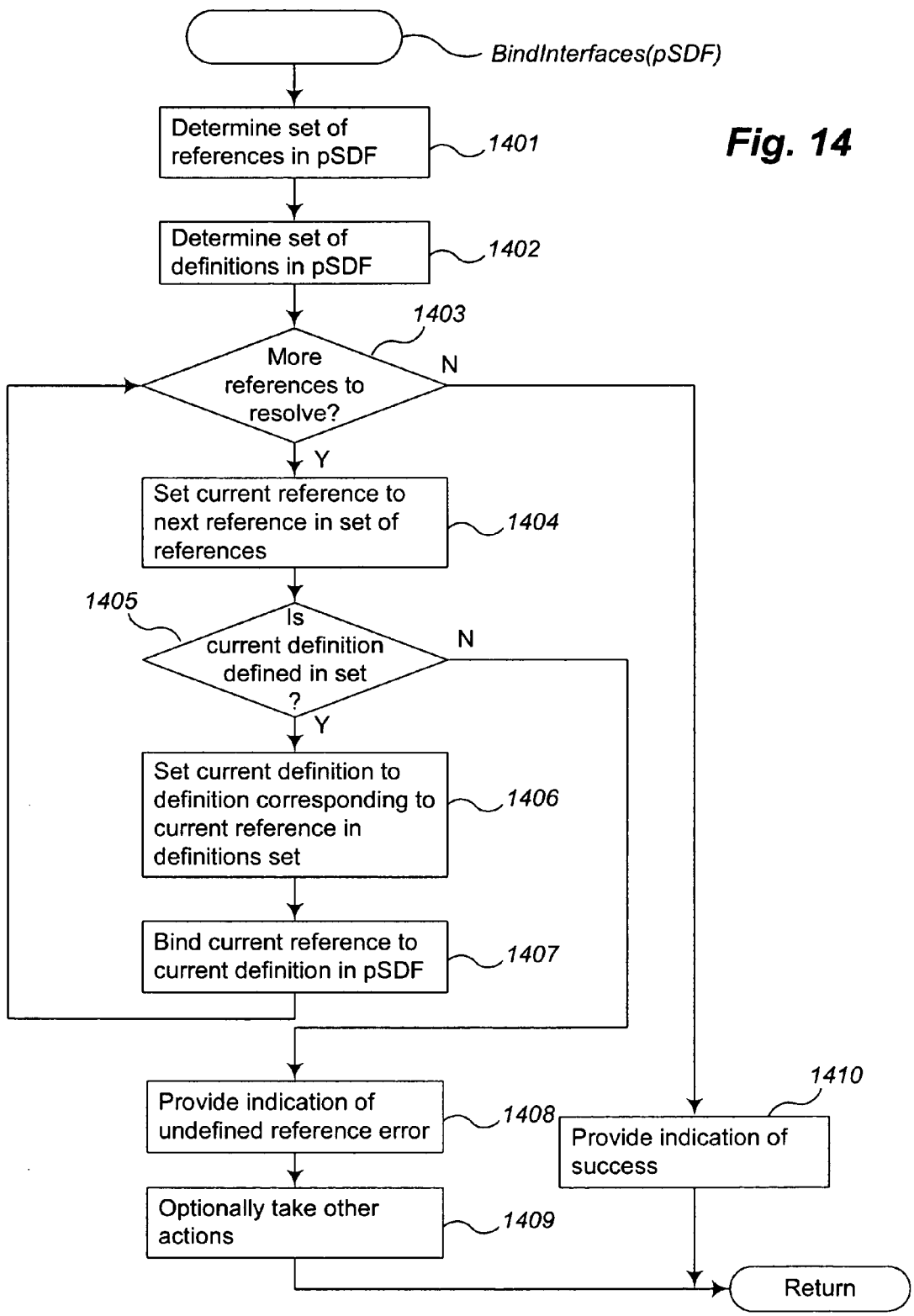
FIG. 14 is an example flow diagram of a BindInterfaces routine used to bind the interfaces in a designated secured destination file.

FIG. 14 is an example flow diagram of a BindInterfaces routine used to bind the interfaces in a designated secured destination file. This routine may be used by the MergePortions routine described with reference to FIG. 12. In embodiments that bind references at secured destination file creation time, the BindInterfaces routine may be provided by, for example, the merging engine 403 described with reference to FIG. 4. The routine initially receives a designation of the secured destination file to be bound. The designation of input to the routine may be implemented by a variety of methods known in the art, including, but not limited to, parameter passing, message passing, signals, sockets, pipes, streams, and files. In step 1401, the routine determines the set of references in the designated secured destination file. The routine proceeds to step 1402 and determines a set of definitions in the secured destination file. In steps 1403-1407, the routine executes a loop to process each reference. In step 1403, the routine determines whether there are more references to be resolved. If so, the routine proceeds to step 1404 and sets the current reference to the next reference in the set of references. In step 1405, the routine determines whether a definition corresponding to the current reference is defined in the set of definitions. If so, the routine proceeds to step 1406 and sets the current definition to the definition in the set of definitions corresponding to the current reference. In step 1407, the routine binds the current reference to the current definition in the secured destination file, as described with reference to FIG. 13. The routine then proceeds to step 1403 and continues processing references until all references in the set of reference have been resolved, or until a reference is discovered to be undefined. When the routine determines that all references have been resolved, the routine proceeds to step 1410 and provides an indication of success. If the routine determines in step 1405 that there exists no definition corresponding to the current reference, it proceeds to step 1408 and provides an indication of an undefined reference error. Errors may be indicated by a variety of means known in the art, including, but not limited to, error codes, signals, exceptions, or messages. In step 1409, the routine optionally takes additional actions for handling an error condition, including notifying system administrators or other system components. After steps 1410 and 1409, the routine terminates.

Figure 15:
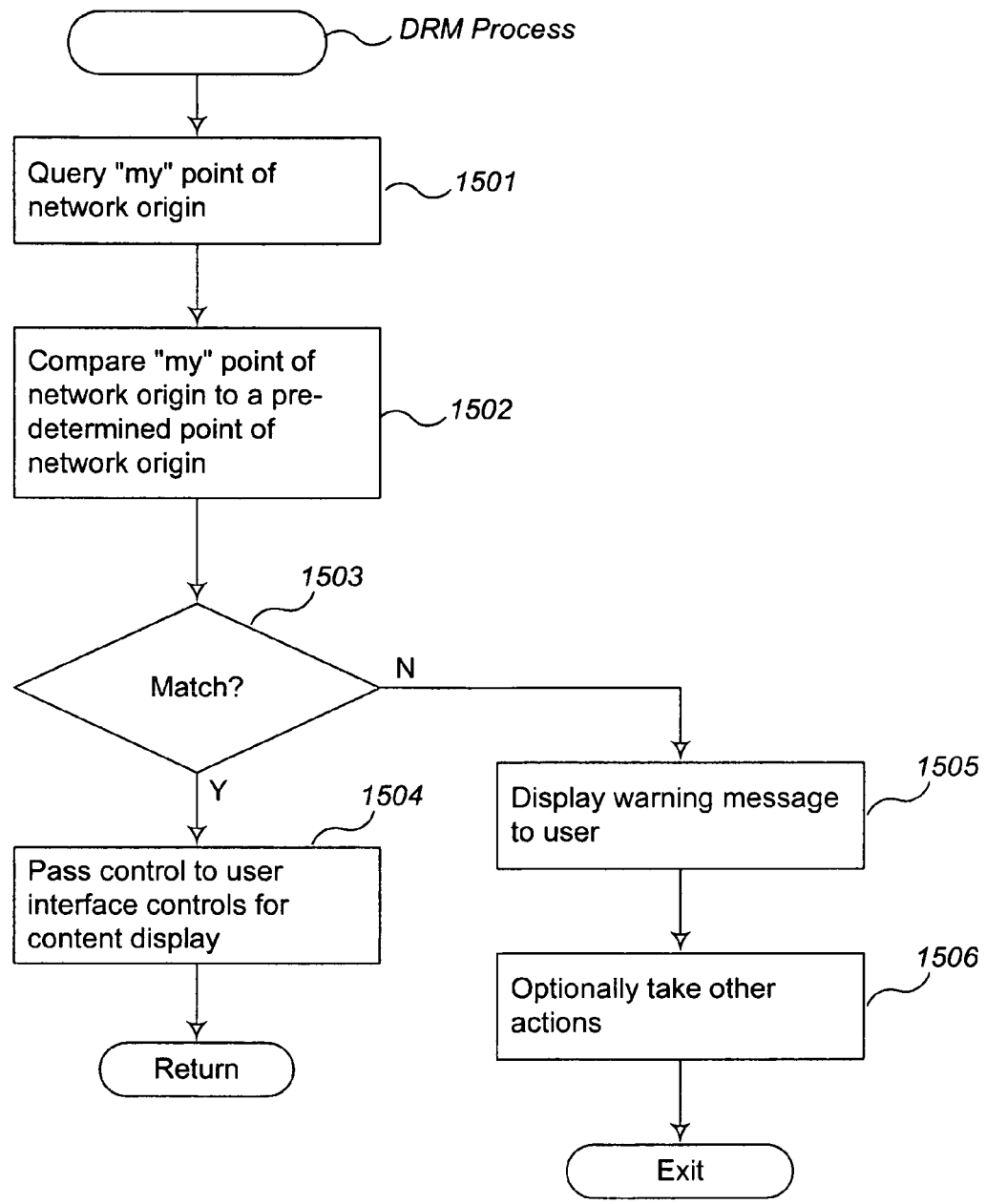
FIG. 15 is an example flow diagram of an example digital rights management process used to limit access to the content in a designated secured destination file to authorized users.

FIG. 15 is an example flow diagram of an example digital rights management process used to limit access to the content in a designated secured destination file to authorized users. This figure depicts a DRM process as implemented by, for example, the digital rights management portion 101 described with reference to FIG. 1. An interpreter or player on the client computing system executes this DRM process upon processing of the secured destination file. Such a DRM process may be executed by any renderer, interpreter, or player that provides an accurate and authentic indication of the point of network origin of the secured destination file it processes. The interpreter-provided point of network origin is the location from whence the secured destination file was loaded by the interpreter. In step 1501, the routine queries the interpreter for the point of network origin of the secured destination file. In step 1502, the routine compares the interpreter-provided point of network origin to a pre-determined point of network origin. In step 1503, the routine determines whether there is a match between the two points of network origin. If so, the routine continues in step 1504, otherwise the routine continues in step 1505. In step 1504, the routine passes control to the user interface controls located within the secured destination file. In this manner, the user interface controls will initialize and begin managing the display of the content portion(s) located within the secured destination file. If it was instead determined in step 1503 that there was no match between the interpreter-provided and pre-determined points of network origin, then in step 1505 the routine displays a warning message to the user. Next, the routine optionally takes other actions in step 1506 before exiting. Optional other actions may include notifying DDRBS operators or other system components that unauthorized users are attempting to view protected content. Alternatively, the optional other action may be to refer the user back to the DDRBS for authentication. Points of network origin may be represented by various means, including Internet Protocol (IP) addresses, domain names, Uniform Resource Locators (URLs), or Uniform Resource Indicators (URIs). Moreover, a point of network origin may contain indications of networked or local file systems. For example, suppose that a secured destination file was downloaded and copied to a local disk, and later shared with second, possibly unauthorized user. Suppose further that the downloaded secured destination file contains a pre-determined point of network origin that is the domain name of the operator of the DDRBS. When the second user attempts to play the secured destination file, the DRM portion will query the interpreter for the current point of network origin. The interpreter will provide a point of network origin that indicates that the file was opened and loaded from the local file system. Because this interpreter-provided point of network origin does not match the pre-determined point of network origin (the domain name of the DDRBS operator) the DRM component will inhibit the or otherwise disallow the display of the content within the secured destination file by failing to pass control the user interface portion.

From the foregoing it will be appreciated that, although specific embodiments have been described herein for purposes of illustration, various modifications may be made without deviating from the spirit and scope of the present disclosure. For example, the methods and systems for performing digital rights bundling discussed herein are applicable to architectures other than a Web-based architecture. In addition, although specific embodiments have been described with reference to software implementations, it should be appreciated that the described embodiments as well as client-side components such as interpreters, players, or renderers may be implemented in software, hardware, or firmware or in any combination thereof. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer implemented method in a content server for dynamically creating a bundle of content protected by digital rights management, comprising:

storing user information for a plurality of users, including a first user;

receiving over a network a request for content, the request having an indication of a bundle and an indication of a user identity, the user identity corresponding to the first user;

in response to the request and the user identity, automatically determining, using at least one computer system, a set of source portions that correspond to the indicated bundle, the determining including selecting the set of source portions based at least in part on one or more user-specific attributes, obtained using the user identity from the user information stored for the first user, to comprise at least one digital rights management portion, at least one user interface portion, and at least one content portion, the at least one user interface portion to control access to and rendering of the at least one content portion, the at least one digital rights management portion to limit access to the at least one content portion to an authorized user, and wherein the one or more user-specific attributes is at least one of the following: a geographic location of the first user, a subscription level associated with the first user, a demographic property of the first user, a usage history of the first user, and an activity preference of the first user;

generating, using the at least one computer system, a set of intermediate portions by translating each portion of the determined set of source portions into a corresponding intermediate portion;

merging, using the at least one computer system, each intermediate portion of the generated set of intermediate portions into a secured destination file that corresponds to the requested content; and forwarding the secured destination file over the network.

2. The method of claim 1 wherein the request further comprises at least one of an indication of a hardware or software environment associated with a user or an indication of a geographic location of the user.

3. The method of claim 1 wherein the automatically determining the set of source portions further comprises determining a set of source portions based at least in part on a hardware or software environment associated with a client computing system.

4. The method of claim 1 wherein the automatically determining the set of source portions further comprises determining the set of source portions based at least in part on one or more user specific attributes and one or more other attributes.

5. The method of claim 4 wherein at least one of the one or more other attributes is at least one of an aggregate usage history associated with multiple users, an agreement with a third-party advertisement provider, a news item, and a weather report.

6. The method of claim 1 wherein the automatically determining the set of source portions further comprises determining a set of source portions based at least in part on at least one of a geographic location or an activity type indicated by a content portion.

7. The method of claim 1 wherein the determined at least one content portion is at least one of a trail guide, a city guide, an image, a map, an advertisement, a coupon, an news article, an editorial, a reference manual, an encyclopedia entry, a magazine article, game content, a journal article, a short story, a novel, or a textbook.

8. The method of claim 1 wherein the determined at least one content portion is a dynamically generated content portion that is based at least in part on the request.

9. The method of claim 8 wherein the dynamically generated content portion is at least one of a weather report, a trail report, road conditions, snow conditions, a city guide, or an entertainment guide.

10. The method of claim 8 wherein the dynamically generated content portion is at least one of a travel itinerary, booking information, flight availability information, flight reservation details, a web log entry, a user-submitted review, a user-submitted rating, a user-submitted photo, or a restaurant guide.

11. The method of claim 1 wherein the determined at least one content portion is an active content portion configured to automatically provide content based on future current conditions.

12. The method of claim 11 wherein the active content portion is at least one of a weather reporter, an active map, a road conditions updater, or a trail conditions updater.

13. The method of claim 11 wherein the active content portion is at least one of a stock ticker, a price watcher, a dining locator, a sport score updater, an instant messenger, a departure time updater, an arrival time updater, a coupon provider, a travel bargain listing provider, a price watcher, or an entertainment listing provider.

14. The method of claim 11 wherein the active content portion is further configured to automatically fetch the provided content from one or more content providers.

15. The method of claim 1 wherein the determined at least one digital rights management portion limits display of the determined at least one content portion to an authorized user.

16. The method of claim 1 wherein the determined at least one digital rights management portion is configured to prevent access to the determined at least one content portion unless the secured destination file has been downloaded from a predetermined network location.

17. The method of claim 1 wherein the determined user interface portion manages the display of the determined at least one content portion.

18. The method of claim 1 wherein the user interface portion includes controls for at least one of zooming, scrolling, printing, or paginating the at least one content portion.

19. The method of claim 1 wherein at least one of the determined set of source portions has an associated source file format that is at least one of a scripting language format, a programming language format, a word processing application format, a desktop publishing application format, an application data format, a page description format, XML, HTML, or text.

20. The method of claim 1 wherein at least one of the generated set of intermediate portions has an associated intermediate file format that is one of SWF bytecode, Java® bytecode, Perl bytecode, Common Language Runtime bytecode, or Python bytecode.

21. The method of claim 1 wherein the secured destination file has an associated intermediate file format that is interpretable by an interpreter.

22. The method of claim 21 wherein the file format is SWF bytecode.

23. The method of claim 21 wherein the file format is one of Java bytecode, Common Language Runtime bytecode, Microsoft Windows® executable, Mach-O, Preferred Executable Format, or Executable and Linking Format.

24. The method of claim 21 wherein the interpreter is a software virtual machine or a hardware instruction-processing unit.

25. The method of claim 1 wherein the secured destination file has an associated secured destination file format and an associated interpreter that provides an accurate indication of a point of network origin to the secured destination file upon interpretation of the secured destination file.

26. The method of claim 1 wherein the generating the set of intermediate portions further comprises generating a set of intermediate portions based at least in part on a hardware or software environment associated with a user.

27. The method of claim 1 wherein the generating the set of intermediate portions further comprises generating a set of intermediate portions based at least in part on a file format of the secured destination file.

28. The method of claim 1 wherein the merging each intermediate portion into the secured destination file further comprises conjoining each intermediate portion with the secured destination file.

29. The method of claim 1 wherein the merging each intermediate portion into the secured destination file further comprises binding a reference in a first intermediate portion of the set of intermediate portions to a definition in a second intermediate portion of the set of intermediate portions.

30. A non-transitory computer-readable medium having contents which when executed by a computer processor perform a method comprising:
receiving over a network a request for content, the request having an indication of a bundle and an indication of a user identity for a first user;
in response to the request and the user identity, automatically determining a set of source portions that correspond to the indicated bundle, the determining including selecting the set of source portions based at least in part on one or more user-specific attributes, obtained using the user identity from user information stored for the first user, to comprise at least one digital rights management portion, at least one user interface portion, and at least one content portion, the at least one user interface portion to control access to and rendering of the at least one content portion;
generating a set of intermediate portions by translating each portion of the determined set of source portions into a corresponding intermediate portion;
merging each intermediate portion of the generated set of intermediate portions into a secured destination file that corresponds to the requested content; and
forwarding the secured destination file over the network;
wherein the at least one digital rights management portion is configured to prevent access to the at least one content portion unless the secured destination file has been downloaded from a predetermined network location;
wherein the one or more user-specific attributes includes at least one of a geographic location of a user, a subscription level associated with a user, and a demographic property of a user.

31. The computer-readable medium of claim 30 wherein the computer-readable medium is a memory of a computing device.

32. The computer-readable medium of claim 30 wherein the contents are instructions that when executed cause the computer processor to perform the method.

33. The computer-readable medium of claim 30 wherein the determined at least one content portion comprises at least one of a trail guide, a city guide, an image, a map, an advertisement, a coupon, an news article, an editorial, a reference manual, an encyclopedia entry, a magazine article, game content, a journal article, a short story, a novel, a textbook, or a dynamically generated content portion.

* * * * *